Dec. 23, 1952  R. C. McLEOD  2,622,790
BLADED STATOR ASSEMBLY PRIMARILY
FOR AXIAL FLOW COMPRESSORS
Filed Feb. 18, 1947  2 SHEETS—SHEET 1

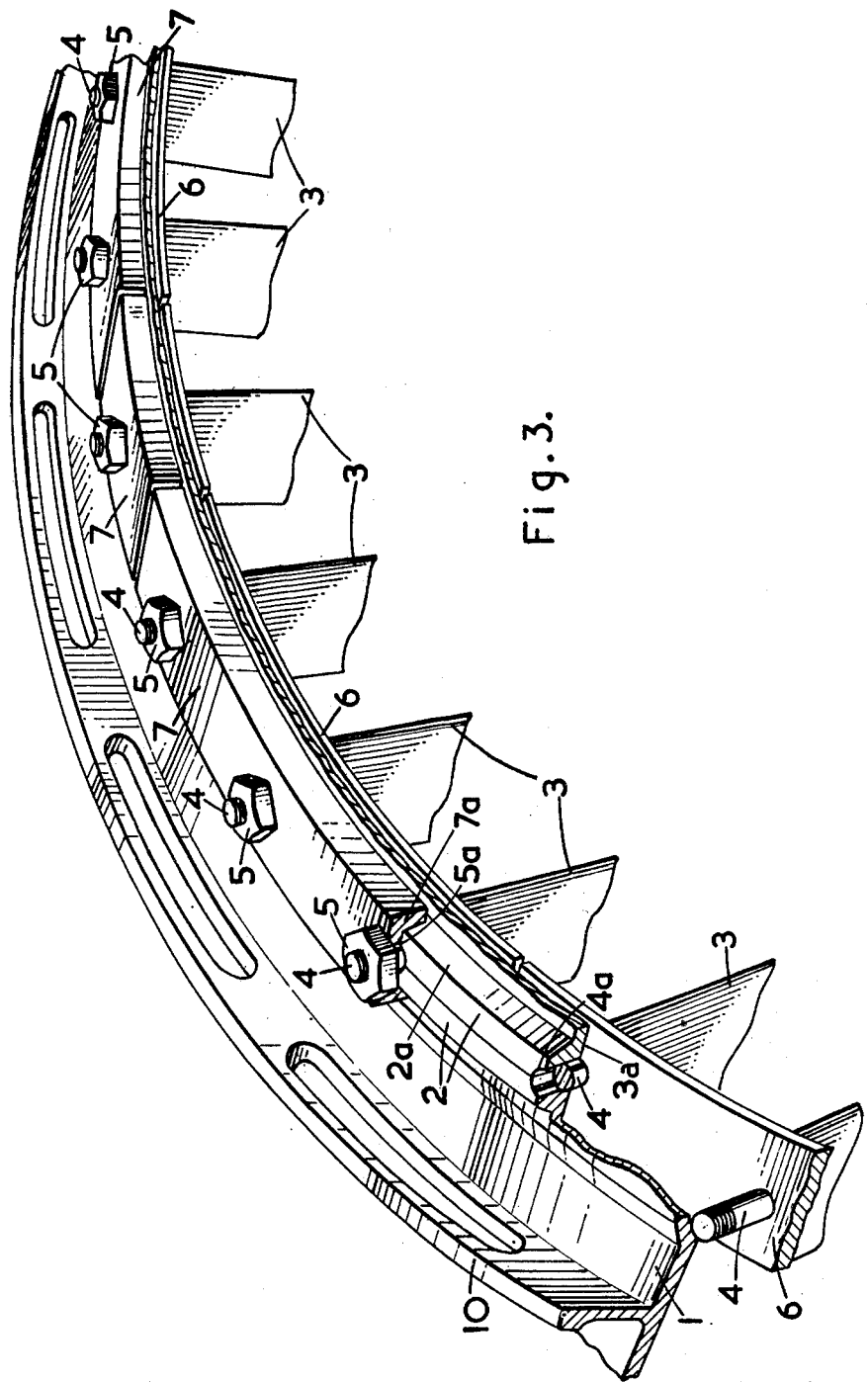

Patented Dec. 23, 1952

2,622,790

UNITED STATES PATENT OFFICE 2,622,790

BLADED STATOR ASSEMBLY PRIMARILY FOR AXIAL FLOW COMPRESSORS

Roderick C. McLeod, Cropston, England, assignor to Power Jets (Research and Development) Limited, London, England, a British company Application February 18, 1947, Serial No. 729,268
In Great Britain February 25, 1946

5 Claims. (Cl. 230—122)

This invention relates to bladed stator assemblies and blade mountings for multi-stage axial flow compressors, turbines and similarly bladed machines. In its main aspect the invention is considered to reside essentially in the application to compressors of the axial flow type, of the conception of building up the stator blade supporting structure from a plurality of axially separate, peripherally one-piece rings, but a constructional form which has arisen in designing for the practical execution of this conception with low structural weight, as will appear later, is thought to have features of merit in relation to the wider field of turbines and similarly bladed machines. Further, whilst being capable of more general application in relation to axial flow compressors, the invention has arisen from the requirements of and offers probably its maximum utility in relation to such compressors for use in gas turbine power plants of aircraft.

In such compressors it has been the practice to employ a longitudinally split two-part casing, each half of which has stator blades mounted thereon in the required number of stages. Such a casing not only involves the use of relatively heavy constructions in order to achieve the necessary mechanical strength, a serious matter in aircraft practice, but also presents a difficult machining problem and, due to its nonuniformity of section, does not distort symmetrically when subjected to uniform internal pressure. It is one object of the invention to provide a basis of design for the stator casing of an axial flow compressor, more particularly for aircraft use, which will offer the possibility of combing lightness, rigidity and strength with the characteristic of distorting symmetrically under internal pressure, and also of simplifying manufacture.

According to the invention in its main aspect a bladed stator assembly of (or for) a multistage axial flow compressor comprises a plurality of peripherally one-piece rings secured together coaxially and in axial succession to afford a unitary tubular supporting structure, devoid of any longitudinal division, for the stator blading, which is mounted thereon.

According to a further feature of the invention the assemblage of rings constitutes not only the immediate supporting structure of the blades but also the main stator casing of the compressor, and in the preferred form of the invention there is at least one ring for each stage of stator blading, whilst for stiffening purposes the rings, or some of them, may incorporate in their structure radially outwardly extending annular stiffening flanges.

According to another feature, the contiguous edges of axially successive rings have formations complementary to each other and the blade roots and cooperating to form seating recesses for the latter. A more specific aspect of the invention which is of importance in designing for light weight and in this respect has value in relation to turbine stator assemblies, is concerned with the relation between the ring structure and the blades; in principle, so far as the main aspect of the invention is concerned, the position of the blades on the rings in the axial direction and the manner of their mounting are immaterial, since in any event at least some of the advantages deriving from the use of the ring construction may be obtained, for example, symmetry of distortion and facility of machining; according to a further feature of the invention in its more specific aspect, however, the blades have root mountings which form elements of locking means by which relative displacement of component rings of the assembly is prevented. More specifically, said locking means includes connector members arranged around the outer surface at the junction of the rings and interengaging therewith to prevent their axial displacement, in combination with radially acting tensioning or clamping means by which the connector elements and the blades are held in place.

In order that the invention may be clearly understood and readily carried into effect, reference will now be made to the accompanying drawings, in which like reference numerals throughout indicate like or equivalent parts and in which:

Figure 3 is a fragmentary perspective view of a part of a one-piece construction ring with locking means.

Figure 1:
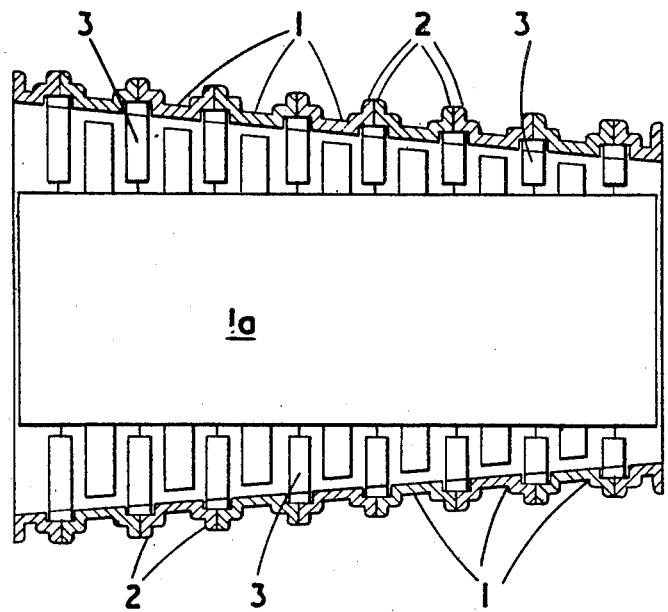
Figure 1 is a diagrammatic sectional view of a stator casing of one piece rings containing a rotor.

The general principle of construction involved is illustrated more or less diagrammatically in Figure 1 as applied to the stator assembly of a multistage axial flow compresser having a flow channel of tapering cross section, the assembly comprising a succession of axial abutting peripherally one-piece rings 1 of generally frusto-conical form suitably secured together edge to edge as by means of cooperating radially outwardly extending encircling flanges 2 to form a unitary tubular structure, devoid of any longitudinal division, on which inwardly extending blades 3 are provided at the junctions thereof as indicated, and mounted thereon, the structure enclosing a bladed rotor generally indicated as 1a.

Figure 2:
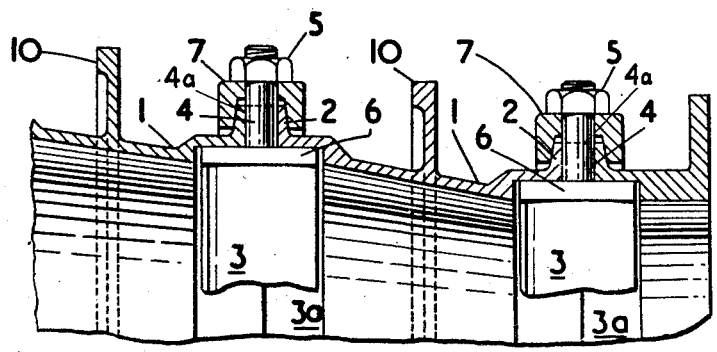
Figure 2 is a fragmentary sectional view of one piece rings and securing means therefor and for the blades.

In the constructional example illustrated in detail in Figures 2 and 3 the root mountings of individual blades 3 or groups of blades form with radially outwardly extending flanges 2 elements of the locking means by which relative displacement of the rings 1 is prevented. Thus, as illustrated, the assembly comprises, as before, a plurality of rings 1 of generally frusto-conical form having their abutting flanges internally and circumferentially recessed so that at the junction of each pair of rings an internal circumferential channel 3a is formed on the inner surface of the structure. The faces of the radially outwardly extending flanges 2 have complementary radial grooves of semi-circular cross section together affording radial passages of circular cross section or bolt holes 4a in the casing. The flanges 2 are provided with axially outer radial faces 2a which are inclined so that the abutting flanges 2 of adjacent rings have together a wedge shaped cross section.

The roots of the stator blades 3, which may be made either individually or as groups, comprise platforms 6 seating in the internal channels 3a of the casing, each platform having one or more screw threaded rod-like projections or shanks 4 arranged to extend radially outwardly through the radial passages or bolt holes 4a. Each pair of flanges 2 of the tubular structure is provided with arcuate connector members 7 of channel cross section with the opening of the channel arranged on the inner surface thereof. The connector members 7 are arranged around the flanges 2 so that the channel walls 7a which are inclined engage the inclined walls 2a of the flanges 2. The connector members 7 have bolt holes 5a through which the shanks 4 project. Nuts 5 are screwed on to the shanks 4 and when tightened up the blades 3 are held in the blade stage channel 3a by their platforms 6 and the connector members 7 are held on the flanges 2 by the walls 7a.

It will be apparent that with the arrangement thus provided, the tensioning of the shanks 4 of the blade roots by tightening of the securing nuts 5 will not only secure the blades 3 in their seating channel but also, by virtue of the wedging action between the sides of the channel form connector members 7 and the axially outer faces 2a of the abutting ring flanges 2, will tend to draw the rings 1 together in the axial direction. In this connection, the connector members 7, as shown, have their walls 7a inclined complementarily to the flange faces 2a with which they engage. At the same time the rings 1 and blades 3 are located in the peripheral sense by the interlocking connection afforded by the engagement of the shanks 4 in the complementary radial grooves forming bolt holes 4d of the ring flanges 2.

To enable the thickness of the rings 1 to be reduced to a minimum without undesirably reducing rigidity, the rings may have at intermediate parts of their length external radial annular flanges 10, which may be made separately and welded on, and may be apertured for lightness. If, however, these flanges 10 are subject to different degrees of temperature variation, it is intended that their mass should be varied to compensate for differential thermal expansion and contraction, for example, by varying the sizes of the apertures therein.

In assembling a compressor having a casing constructed in accordance with the invention, the ring constituting the larger end of the compressor is first passed over the compressor rotor, the blades are positioned, the next ring is brought into position to engage the blade roots or the first ring, as the case may be, and the two rings are then secured together, this process then being repeated until the smallest ring is in position. For dismantling the process is reversed.

The use of a ring construction in accordance with the invention permits the employment of forgings of much thinner section and smaller weight than is possible with the more usual two-part cast construction, and also simplifies machining whilst the sectional method of assembling and dismantling arising from the use of the ring construction facilitates the setting and inspection of the blading stage by stage. The rings can also readily be made of uniform section, so that they will distort symmetrically under uniform internal pressure.

The use of the blade mounting to constitute also part of the ring interlocking means effects a further advantageous saving of weight; in fact the entire construction lends itself to the combination of extreme lightness with great rigidity in a very high degree.

I claim:

1. A bladed stator assembly of an axial flow compressor or turbine comprising in combination a plurality of one piece construction ring members arranged in axially abutting succession to form a tubular casing structure devoid of any longitudinal divisions, the contiguous edges of any abutting pair of ring members being shaped to form by their junction an encircling channel for seating a stage of blades around the inner surfaces of said structure, the number of blade stage channels so formed being one less than the number of ring members in the said structure; a plurality of blades seating in each blade stage channel; a plurality of securing means adapted both to secure any abutting pair of ring members together and to secure a plurality of blades of a stage in said blade stage channel formed by the junction of said pair of ring members, each plurality of securing means consisting of a plurality of ring member retaining means distributed around the outer circumferential surface of said structure to hold their said pair of ring members against axial displacement and a plurality of tension means, each extending through a passageway formed in said structure from the said blade stage channel to connect said stage of blades to their said plurality of ring member retaining means under radial tension thereby holding said plurality ring member retaining means and said stage of blades in their respective positions and locking said ring members against axial and relative rotary displacement.

2. A bladed stator assembly as claimed in claim 1 wherein each of said ring members of said structure have at their ends encircling flanges extending outwardly from the outer surface in a radial plane which when said ring members abut each other in said structure lie adjacent flanges of the abutting ring member forming pairs of flanges at each blade stage channel, and each said ring member retaining means comprises an arcuate connector member of channel cross section with the opening of the channel on the inner surface to embrace an arc of said pair of flanges between the walls thereof and locking said ring members against axial displacement.

3. A bladed stator assembly as claimed in claim 2 wherein the wall of each said channel connector member and the faces of said pair of flanges embraced thereby are formed with complementary inclined faces adapted to draw said ring members together when said connector member is located on said flanges.

4. A bladed stator assembly as claimed in claim 1, wherein said passageways for said plurality of tension means are formed by a plurality of complementary radially extending grooves in the abutting faces of each pair of flanges arranged groove to groove and extending outwardly from their said channel to the exterior of said structure and each said tension means comprises a rod like projection extending from said stage of blades associated with said channel and extending through one of said passageways to its said ring member retaining means to lock said ring members against relative rotary displacement.

5. A bladed stator assembly of a multi-stage axial flow compressor or turbine comprising a plurality of one piece construction ring members arranged in axially abutting succession, the abutting ends of any pair of abutting ring members in the succession being formed with encircling flanges extending radially outwardly from the outer surface of the members and with circumferential recesses on the inner surface of the members and with a plurality of grooves of semicircular cross section equally spaced around the contacting faces of said flanges and extending radially outwardly from said recesses to the exterior of said structure, said plurality of ring members being arranged with said abutting ends, flange to flange, radial groove to radial groove and recess to recess to form a tubular structure devoid of any longitudinal divisions but with a plurality of pairs of abutting encircling flanges, with a plurality of blade stage seating channels formed by combination of said recesses and with a plurality of radial passages extending from each of said channels; a plurality of blades in each said channel, each provided with a root platform for seating in their said channel and a shank having a screw threaded end adapted to extend through a radial passage from their said channel to the exterior of said structure beyond their said pair of abutting flanges; a plurality of arcuate connector members of channel cross section with the opening of the channel on the inner surface thereof to embrace each pair of abutting flanges between their channel walls, each connector member having at least one hole through which a shank projects; a plurality of locking nuts, one for each screw threaded shank, associated with each pair of abutting flanges, adapted to draw the associated plurality of arcuate connector members on to their said pair of abutting flanges and to draw their associated plurality of root platforms of said blades into the associated blade stage seating channel and locking said ring members against axial and relative rotary displacement.

R. C. McLEOD.

REFERENCES CITED

The following references are of record in the file of this patent:

UNITED STATES PATENTS

| Number | Name | Date |
|---|---|---|
| 936,114 | Gardner | Oct. 5, 1909 |
| 995,358 | Lieber | June 13, 1911 |
| 2,425,177 | Cronstedt | Aug. 5, 1947 |
| 2,428,999 | Smith et al. | Oct. 14, 1947 |